I. & S. STOUT.
Wheel Cultivator.
No. 40,776. Patented Dec. 1, 1863.
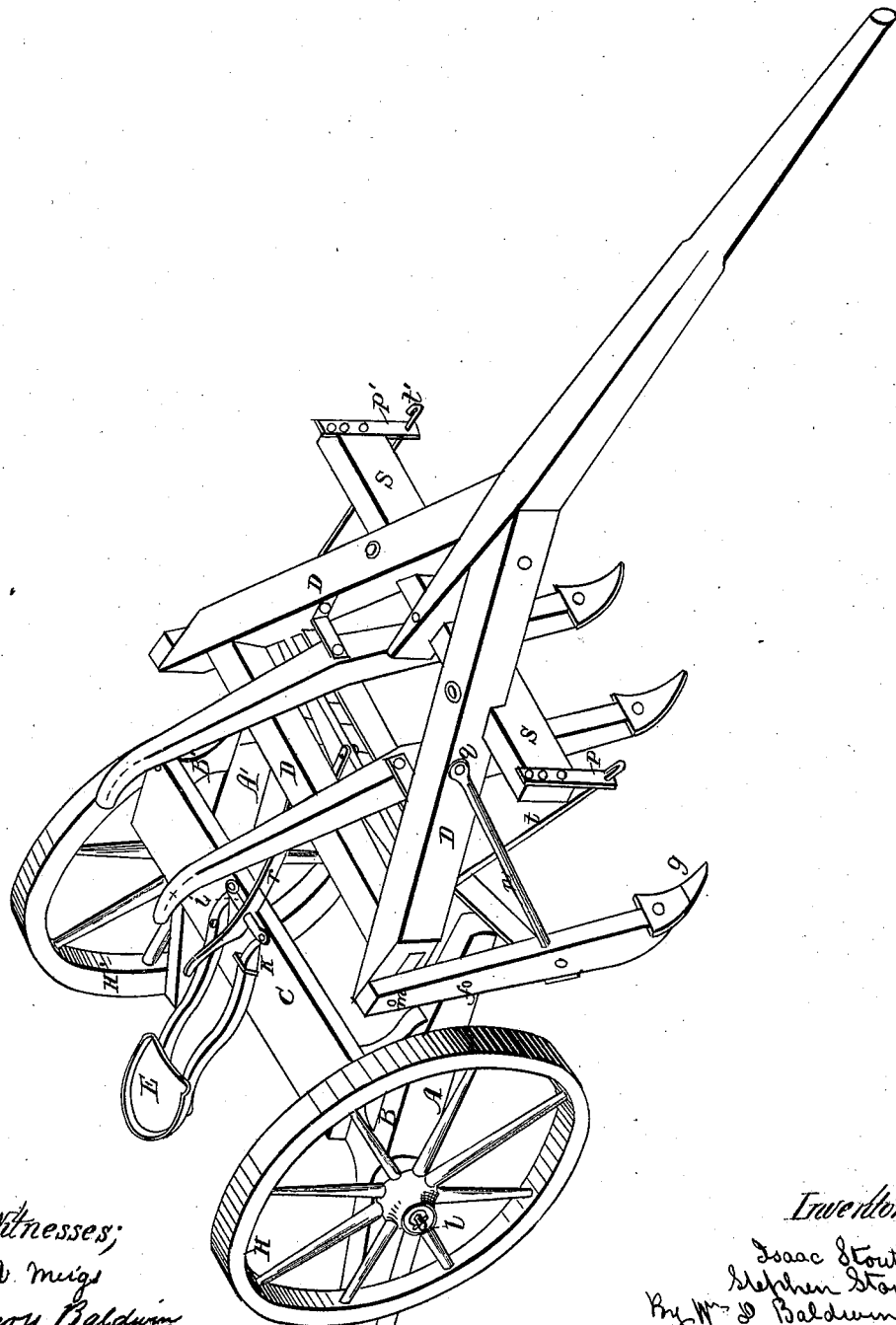
Witnesses;
Joe V. Meigs
Henry Baldwin
Inventors;
Isaac Stout
Stephen Stout
By Wm D Baldwin
atty

UNITED STATES PATENT OFFICE.

ISAAC STOUT AND STEPHEN STOUT, OF TREMONT, ILLINOIS.

IMPROVEMENT IN CULTIVATORS.

Specification forming part of Letters Patent No. 40,776, dated December 1, 1863.

*To all whom it may concern:*

Be it known that we, ISAAC STOUT and STEPHEN STOUT, both of Tremont, in the county of Tazewell and State of Illinois, have invented certain new and useful Improvements in Cultivators, of which the following is a full, clear, and exact description, reference being had to the accompanying drawing, which makes part of this specification, and which represents a view in perspective of a cultivator embracing our improvements.

Letters Patent of the United States were granted to Isaac Stout on the 16th of April, 1861, and numbered 1,088, for an improvement in cultivators. The invention therein patented consisted in attaching the plows directly to the handles and so securing the handles to the frame as to permit the driver to adapt the position of the plows to any variation in the line of the growing corn, and at the same time keep the plows at any desired distance from the center of the rows.

Now, our present invention has relation to improvements on the said patent, by which we are enabled to better support the cultivator, vary the depth of its work, render the cultivator teeth or plows more secure in their position on the frame, hold them out of the ground when turning, changing the line of draft, and enabling the driver to change his attitude upon the frame from a standing to a sitting posture; and our invention consists in so constructing the auxiliary frame as to combine therewith both a seat and a standing support for the driver, studs for the supporting-wheels, a catch for the bar to regulate the position of the teeth of the cultivator, and projections by which the whole frame is attached to the front frame, which supports the plows.

Our invention further consists in so constructing the main frame of the cultivator as to combine therewith a device for changing the line of draft, a central point of support for the plow-handles, and thin braces and a lever-catch to regulate the depth of plowing or remove the plows from the earth while turning the cultivator.

Our invention further consists in so combining a hinged seat and fixed standing support for the driver that whether sitting or standing he can by a change of his position control the depth of plowing or raise the cultivator-teeth out of the ground when turning or in going to and from the field.

In the accompanying drawing the auxiliary or near frame, A, is shown as constructed of two side pieces having rests B B′, that support on their top a strong cross-bar, C, of the proper length to suit the internal width of the front frame, D, and of a height suitable to carry the driver's seat E above the growing crop. The side pieces are long enough to sustain at their rear end standing supports for the driver, which supports project inward as a flange, and are secured to the under sides of the side pieces, and admit at their forward ends of a screw attachment to the inside of the side cultivator-beams of the front frame by bolts or screws $f$, and having also a free space for the rotation of the supporting-wheels H H′ at a proper distance from the front frame, where they run on studs or hubs $l$, strongly secured to the outer sides of the frame A. Thus the construction of the rear frame brings the wheels in a position to run in the furrow of the side cultivators, $g$.

About the center of the cross-piece of the frame, and near its front edge, is secured a simple lever-catch, $i$, and behind this catch is secured the driver's seat, (which may be made of single or of separate pieces for its support,) having a projection, $k$, fitting into a staple on one side, and being secured on the other by a bolt or screw that will admit the seat to be turned out of the way of the driver when standing on the flanges of the frame, or be held securely by the staple and bolt when in position for the driver to ride on. This cross-piece is firmly braced at each end by braces extending to the side pieces of the frame. Thus the construction of my frame gives a more secure support to the cultivator, conveniently supports the driver when standing or sitting, enables the wheels to run in the furrows of the side cultivators or plows, enables the seat to be turned out of the driver's way when standing, gives a secure position for the lever-catch, and prevents any injury to the standing corn.

The front frame is constructed with a view to strength and lightness by giving it a triangular form and placing the side braces, which connect the tongue with the frame, so that a single front and rear cross-brace is all that is necessary.

The plow-handles are placed substantially as in the patent of Isaac Stout above mentioned, and have the same capability of side vibration. Our improvement in the mode of strengthening these handles and rendering the plows firm on the frame is effected by pivoting the handles strongly on their supporting-bar and extending a brace-rod from a staple beneath the rear cross-brace of the frame to the bottom of the handles. These brace-rods are so bolted to the rear frame as to allow them a slight vibration on their bolts to permit the side vibration of the plows attached to the handles, and the lower ends of these brace-rods are firmly attached to the lower ends of the handles by bolts just above the top of the plow.

The side plows are attached to beams that are firmly fastened to the outer sides of the rear of the frame, as at $m$, and are strongly secured in position by rigid brace-rods $n$, that are fastened at one end to the lower ends of the plow-beams and at the other end to the main frame, as at $o$ and $q$.

The rear cross-brace of the frame has a hinged lever, $r$, attached to it, with catches or notches on its under edge to fit on the catch-bar of the rear frame, and a handle so placed as to be within reach of the driver, whether sitting or standing on the rear frame.

It will be perceived that by attaching the front and rear frames at the point $f$ this point forms a fulcrum for both frames, so that when the driver desires to lift the cultivators out of the ground to turn or go to and return from the field he has only to shorten this lever by a pull on this lever $r$ and fasten it on the catch-bar, or when he wants to plow deeper to lengthen the lever to another tooth or notch and again fasten it upon the catch.

The outer ends of the front cross-beam, S, of the main or front frame projects as far on each side of the tongue or pole as may be necessary to carry properly single-trees for the team. These single-trees are attached to hooked rods $t\ t'$, fastened at their rear ends to the double-tree secured beneath the main frame, and are supported at their hooked ends in adjustable plates $p\ p'$, fastened by screw-bolts to the outer ends and in front of the front cross-brace S. Thus by shifting the vertical position of these plates the line of the draft is changed and made easily adaptable to the comfort of the team.

What we claim as our invention, and desire to secure by Letters Patent of the United States, is—

1. The combination and arrangement of a front and rear frame in a cultivator, when constructed in the manner and for the purposes described.

2. The combination and arrangement, in the rear frame of the cultivator, of a driver's seat, made adjustable, and a standing support for the driver, a lever-catch bar, studs for the supporting-wheels, and a projecting connection, $f$, all operating substantially in the manner and for the purpose described.

3. The combination and arrangement, in the main or front frame of the cultivator, of the hinged lever, the central support for the middle plow-handles and their braces, a lever-catch to regulate the depth of plowing, and an adjusting device to change the line of draft, all operating substantially in the manner and for the purposes set forth.

In testimony whereof we have hereunto subscribed our names.

ISAAC STOUT.
STEPHEN STOUT.

Witnesses:
S. AMSBARY,
JOHN MARCH.